UNITED STATES PATENT OFFICE.

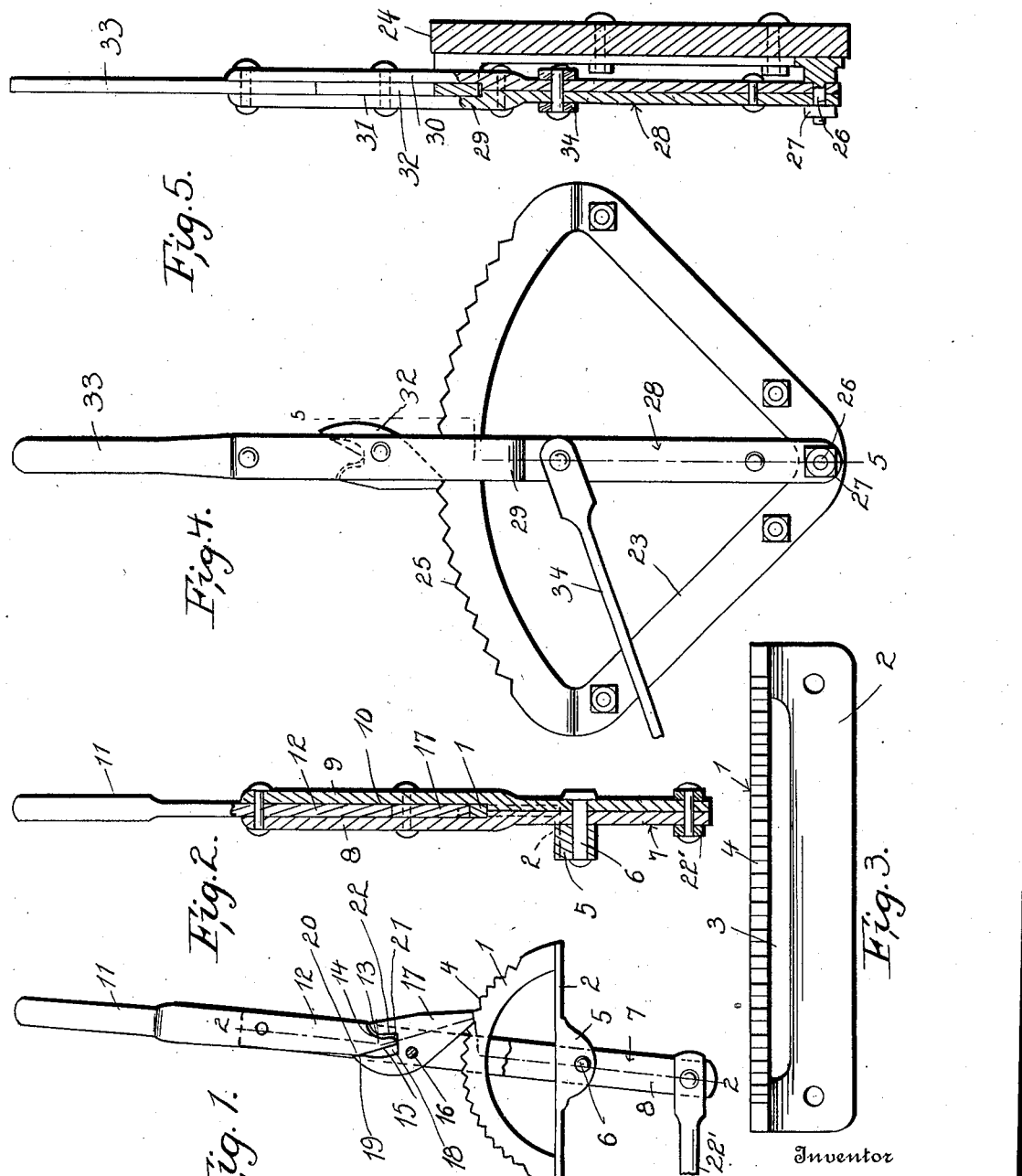

MORGAN S. CLARK, OF ROANOKE, VIRGINIA.

BRAKE-OPERATING MEANS.

1,091,121.  Specification of Letters Patent.  Patented Mar. 24, 1914.

Application filed December 4, 1912. Serial No. 734,978.

*To all whom it may concern:*

Be it known that I, MORGAN S. CLARK, a citizen of the United States, residing at Roanoke, in the county of Roanoke and State of Virginia, have invented certain new and useful Improvements in Brake-Operating Means, of which the following is a specification, reference being had to the accompanying drawings.

This invention relates to new and useful improvements in brake operating means and has for its object to provide an improved locking means for the brake lever.

A further object of the invention resides in providing a brake lever having a pivoted handle thereon which operates a pivoted pawl and a still further object resides in providing a pawl and handle member which are so designed as to effectively dispose said pawl at the slightest movement of the handle.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a side elevation of the brake lever mounted on the guide with portions of the lever broken away to show the pawl thereon. Fig. 2 is a vertical section as seen on line 2—2, Fig. 1. Fig. 3 is a plan view of the guide member carrying the ratchet. Fig. 4 is a side elevation of a slightly modified form of the invention; and Fig. 5 is a vertical section therethrough as seen on line 5—5, Fig. 4.

In describing my invention, I shall refer to the drawings in which similar reference characters designate corresponding parts throughout the several views and in which 1 indicates an arcuate guide plate formed on a base plate 2, the latter extending laterally from one side of said guide member 1 and connected to the latter at its ends, thereby providing a space 3 between the vertical plane of the plate 1 and the inner side edge of the plate 2. The upper edge of the plate 1 is provided with ratchet teeth 4 and the plate 2 is adapted to be secured to the bed or frame of a vehicle, particularly an automobile (not shown).

Formed on the under face of the base plate 2, about centrally thereof is a bearing 5, through which extends a pivot pin 6 carrying the lever 7. This lever comprises a pair of lever sections 8 and 9 which extend on opposite faces of the guide plate 1, the one section extending through the space 3 and the other on the outer face of said guide plate. These lever sections are adapted to have their inner opposed faces abutting one another for a portion of their length, this portion being toward the lower ends thereof and the upper portions of said levers are so designed as to provide a space 10 between the same when properly applied together. The space 10, above referred to, receives therein the arcuate guide strip 1 and pivotally connected between the lever sections 8 and 9, at their upper ends, is a handle member 11. This handle member has a shank 12 thereon which extends below the pivot points and the lower free end of the same is so designed as to form a substantial tongue or the like 13. This tongue is formed by concaving one side edge as shown at 14 and inwardly beveling the opposite side edge as shown at 15. The purpose of this tongue will be hereinafter and more particularly described. Also pivotally carried as shown at 16 in the space 10, between the lever sections 8 and 9, is a pawl or clutch member 17, said pawl being tapered toward its lower end to provide a contacting end for coöperation with the ratchet teeth 4 on the guide strip 1. The upper portion of this pawl above the pivot point is cut-away to form a cavity or the like 18 in which is received the tongue 13, at the free end of the handle member 11. The walls of this cavity 18 are so designed as to readily receive the tongue 13 therein and is also so designed that a point 19 at the upper end of the one wall will contact with a point 20 on the one edge of said tongue when said handle member is swung in one direction. When said handle member is swung in the opposite direction, a point 21 on the lower end of said tongue will contact with a point 22 on the lower portion of the wall of the cavity opposite that having the contacting point 19 thereon and thus upon the two dispositions of the handle member, the pawl will be disposed in opposite directions. The lever 7 as will be understood, from the above description extends to a point below the pivot of the fulcrum point 6 and has pivoted to this end, the brake rod 22' which extends rearwardly therefrom and connects, in the usual or any preferred manner to the brakes of the vehicle.

The above operating means is particularly adapted for use in connection with automobiles, but in Figs. 4 and 5 I have shown a slightly modified form of the invention which is more readily adapted for use in connection with wagons. In this form, a guide member 23 of substantially triangular design is secured to the outer face of the wagon bed 24, the upper arm of this substantially triangular guide being arcuately designed and provided with ratchet teeth 25. This upper arm just referred to is also bent to a plane to one side of the plane of the other two arms of the guide member, thereby spacing the same from the wagon bed 24, while the other two arms are secured flatly thereagainst and at the point of intersection of the other two arms of the guide member at the lowermost point of the latter is a laterally extending stud 26. Pivotally mounted on this stud 26 and held thereon by means of the nut 27, is the lever 28 which is composed of two sections 29 and 30, as in the other form, and these sections are so designed as to provide a space 31 between the same at the upper portions thereof. Said sections of the lever which are secured together at various points throughout their length, receive therebetween in the space 31 the upper arcuate arm of the guide member 23 and pivotally mounted between these lever sections in the space 31, is the pawl 32, similar to the pawl 17 described in the other form. Also fulcrumed between the lever sections at the upper ends thereof is the handle member 33 which is identical to the handle member 11 heretofore described. This handle member coöperates with the pawl in the same manner as described in connection with the other form and pivotally connected to the lever sections above the stud 26, is the brake rod 34.

In operation, when it is desired to apply the brakes to the vehicle, the driver grasps the handle 11 and first pushes forwardly thereon, which action obviously disengages the pawl 17 from the teeth 4. The handle member 11 is then drawn rearwardly, the same still being retained in its inclined position, which action will draw the upper end of the lever 7 rearwardly and effectively operate the brake rod. When the lever 7 has been swung on its fulcrum point to the desired angle, the handle member 11 is drawn rearwardly to swing the same on its fulcrum point and this operation permits the point 22 of the tongue thereof to contact with the point 21 of the pawl 17, thereby swinging said pawl on its fulcrum point so as to engage the teeth of the segment 1. The lever 7 will then be securely held in its adjusted position. When it is desired to release the brakes, the reverse operation is true.

From the foregoing it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

The combination with a notched segment, and a fulcrumed operating lever arranged in connection therewith; of a handle lever fulcrumed intermediate of its ends on the upper portion of said operating lever to extend longitudinally of the latter, the lower working end of said handle lever being concaved on one side and beveled inwardly on the opposite side to form a tongue thereon, and a pawl pivoted intermediate of its ends on the operating lever for operative engagement with the teeth of the segment, said pawl having a cavity in the upper end thereof receiving the tongue of the handle lever therein, the one wall of said cavity being designed coincident to the concaved side of said tongue and adapted to have contact with the tip of the latter when said handle lever is swung in one direction, the opposite wall of said cavity having a flat portion at the upper termination thereof for engagement with the inner end of the flat heel-like side of the tongue on said handle lever when the latter is swung in the opposite direction, whereby said pawl may be disposed into and out of engagement with said segment.

In testimony whereof I hereunto affix my signature in the presence of two witnesses.

MORGAN S. CLARK.

Witnesses:
I. M. ANDREWS,
L. B. CABANISS.